July 14, 1925.  
A. J. YORK  
BALL BEARING SHAFT  
Filed Sept. 24, 1921  
1,546,278
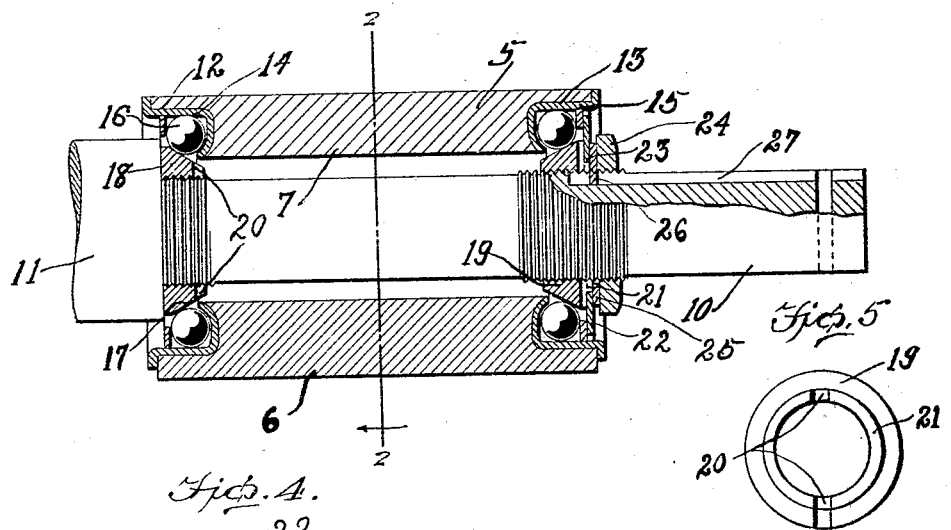
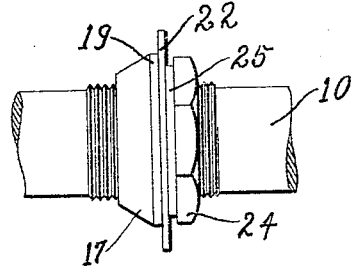
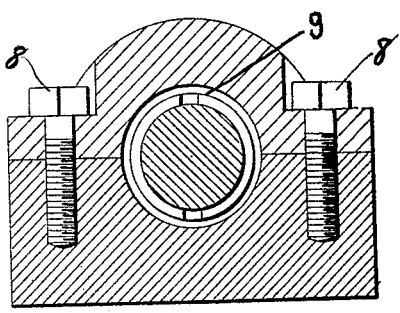
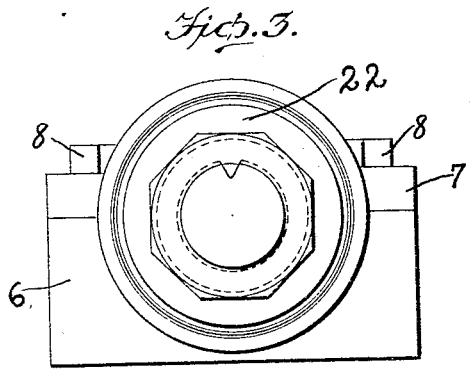
Inventor  
Andrew J. York Patented July 14, 1925.

1,546,278

UNITED STATES PATENT OFFICE.

ANDREW J. YORK, OF REDBOILING SPRINGS, TENNESSEE, ASSIGNOR OF ONE-THIRD TO J. O. HOPKINS AND ONE-THIRD TO B. M. REEVES, BOTH OF REDBOILING SPRINGS, TENNESSEE.

BALL-BEARING SHAFT.

Application filed September 24, 1921. Serial No. 503,014.

*To all whom it may concern:*

Be it known that I, ANDREW JOHNSON YORK, a citizen of the United States, residing at Redboiling Springs, Tennessee, have invented certain new and useful Improvements in Ball-Bearing Shafts, of which the following is a specification.

This invention relates to certain new and useful improvements in bearings, the purpose of the invention being to provide a bearing particularly adapted for use in connection with the engine crank shaft of an automobile or like vehicle.

In the drawings, Fig. 1 is a longitudinal section view of a bearing constructed in accordance with my invention and applied to a shaft, certain parts associated with the shaft being shown in section.

Fig. 2, is a sectional view on the line 2—2 of Fig. 1.

Fig. 3, is an end view of the construction shown in Fig. 1.

Fig. 4, is a detail of a portion of the shaft and parts associated therewith, and Fig. 5 is a side elevation of a shaft ring.

Referring more particularly to the drawings, 5 designates a bearing comprising a pair of complementary parts 6 and 7, secured together by bolts 8 and defining between them a shaft receiving bore 9 in which is mounted the reduced portion 10, of a shaft 11, such as an engine crank shaft. The parts 6 and 7 have their opposing inner end edges cut out to provide recesses 12 and 13, at opposite ends of the bearing in which are seated ball retainers 14 and 15 containing each a circular series of balls 16 adapted to bear against the inclined inner faces 17 of a pair of bearing rings 18 and 19 threadedly engaged on the shaft portion 10.

The ring 18 being threaded against the enlarged portion 11 of the shaft is, to all intents and purposes stationary, but the ring 19 is adjustable longitudinally of the shaft by a turning movement to vary the distance therebetween and ring 18, the purpose of this adjustment being to keep the rings in proper contact with the balls 16 and thus prevent undue play of the shaft.

In order to provide for the positioning and removal thereof, the rings 18 and 19 have diametrically oppositely disposed slots 20 formed in their outer faces adapted to be engaged by a spanner wrench or like tool. The outer face of the ring 19 is further formed with an annular shoulder 21, on which is supported an annulus 22 which closes the adjacent end of the bearing 5 and serves to prevent dust and foreign matter from reaching the ball bearings 16 and the interior of the bearing. Annulus 22 is provided with a tongue 23 which enters one of the slots 20 in the ring 19 to hold the annulus against turning movement relative to the said ring 19, the annulus being held against the outer face of the ring 19 by a lock nut 24 threaded on the shaft portion 10. A washer 25 is preferably interposed between the lock nut and annulus 22 and is provided with a tongue 26 adapted to enter a slot in the shaft portion 10.

The lock nut 24 also serves to hold the ring 19 in its various positions of adjustment.

From the foregoing it will be apparent that I have provided an improved form of bearing particularly adapted for use in connection with engine crank shafts and which is so constructed that the bearing may be readily disengaged with the shaft and disassembled to facilitate repairing or replacement of the members comprising the same.

What I claim as my invention is as follows:

A bearing comprising a shaft a tubular body portion adapted to receive the shaft therethrough, said body portion having recesses formed at its inner terminal edges, and ball retainers seated in said recesses and carrying balls for engagement with said shaft each of said retainers presenting angularly related wall portions engaging the radially and longitudinally extending walls of the recess, the free edge of the radial wall of each retainer being curved to underlie the longitudinally extending wall portion and the said longitudinally extending wall portion having its free edge bent outwardly to lie against the adjacent end of the body portion an annulus secured to the longitudinally extending wall portion of each retainer and cooperating with the grooved portion of the radial wall of the retainer to hold in place the balls interposed therebetween, bearing nuts threaded on the shaft and provided with inclined surfaces engaging the balls carried by said retainers, one of said nuts being provided on its outer face with an annular projecting shoulder, a ring shaped plate provided with a central opening receiving said shoulder therethrough and having its outer edge portion lying against the annulus of the adjacent ball retainer in lapping engagement with the inner edge of said annulus so as to close the space intervening between the latter and the nut, a washer covering the joint between the ring shaped plate and the aforesaid shoulder and provided with a projection entering a groove formed in the shaft and a nut threaded on the shaft and serving to hold said plate and washer in position to provide a dust excluding covering for the ball retainer.

In testimony whereof I hereunto affix my signature.

ANDREW J. YORK.